United States Patent [19]

Zinnen

[11] Patent Number: 4,676,288
[45] Date of Patent: Jun. 30, 1987

[54] VEHICLE WHEEL AND PNEUMATIC TIRE ASSEMBLY HAVING AN EMERGENCY OPERATION SUPPORT SURFACE

[75] Inventor: Norbert Zinnen, Aachen, Fed. Rep. of Germany

[73] Assignee: Uniroyal Englebert Reifen GmbH, Aachen, Fed. Rep. of Germany

[21] Appl. No.: 703,893

[22] Filed: Feb. 21, 1985

[30] Foreign Application Priority Data

Feb. 21, 1984 [DE] Fed. Rep. of Germany ... 8405217[U]

[51] Int. Cl.$^4$ .................. B60C 17/04; B60C 17/10
[52] U.S. Cl. .................. 152/158; 152/520; 152/521
[58] Field of Search .......... 152/520, 521, 158, 457, 152/339.1–342.1, 500, 516, 518, 519, 155, 157, 203

[56] References Cited

U.S. PATENT DOCUMENTS

| 768,684 | 8/1904 | Parmley | 152/342.1 |
| 1,091,124 | 3/1914 | Dyer | 152/500 |
| 3,288,193 | 11/1966 | Mantzel | 152/158 |
| 3,913,654 | 10/1975 | French | 152/521 |
| 3,993,114 | 11/1976 | Hinderks | 152/340.1 |

FOREIGN PATENT DOCUMENTS

| 956380 | 1/1957 | Fed. Rep. of Germany | 152/158 |
| 83/00661 | 3/1983 | PCT Int'l Appl. | 152/158 |

*Primary Examiner*—David Simmons
*Assistant Examiner*—Ramon R. Hoch
*Attorney, Agent, or Firm*—Becker & Becker

[57] ABSTRACT

A vehicle wheel and tire assembly. In the event of an emergency operation, the pneumatic tire contacts a support member of the rim. A stabilizing arrangement protects the wheel and tire assembly from moving in an uncontrolled manner. This stabilizing arrangement is in the form of a corrugation, which is provided both on the inner surface of the tire and on the support member of the rim. This corrugation, which can be a fine groove system, reliably assures that the tire and the rim are provided with steering stability, especially when driving in curves.

13 Claims, 7 Drawing Figures

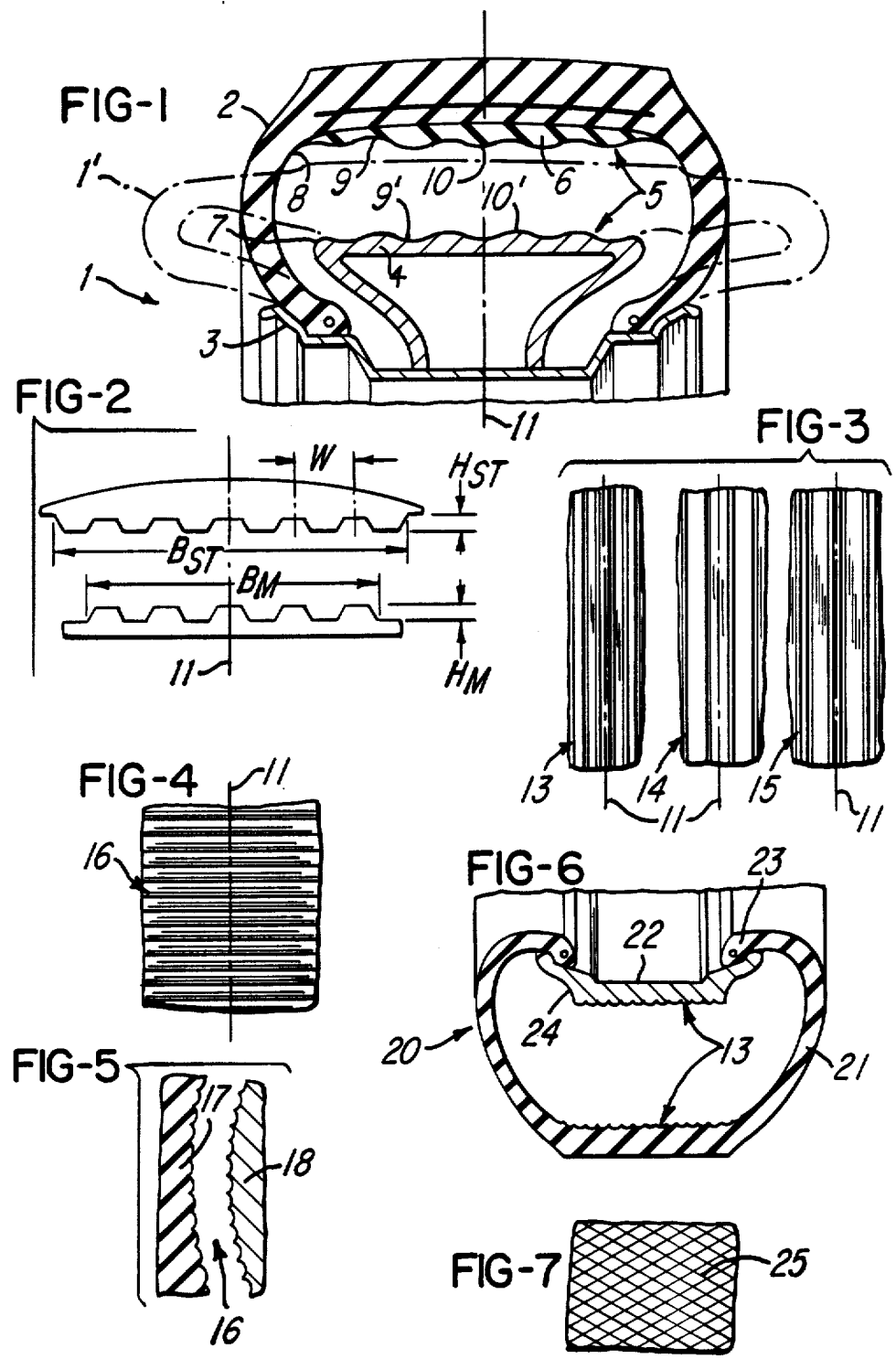

4,676,288

VEHICLE WHEEL AND PNEUMATIC TIRE ASSEMBLY HAVING AN EMERGENCY OPERATION SUPPORT SURFACE

BACKGROUND OF THE INVENTION

1. Field of the Invention

The present invention relates to a vehicle wheel and pneumatic tire assembly which comprises an essentially one-piece wheel rim and a pneumatic tire. The rim is provided with rim shoulders for receiving the tire beads, and is provided with support surfaces which during a tire emergency operation receive the inner surface of the tire carcass when the tire is under inflated or deflated. The pneumatic tire essentially comprises a carcass, especially a radial carcass, and has tire beads, side walls, and a tread which is reinforced with a belt-like reinforcing insert, and which is provided with a tread profiling.

2. Description of the Prior Art

The vehicle wheel includes not only rims of the type having radially outwardly disposed rim shoulders, a rim base, and an annular emergency support member disposed in the base, but also rims of the type having radially inwardly disposed rim shoulders and a radially outer free rim surface which in the event of an emergency operation forms the support surface for the tire.

The pneumatic tire is constructed in conformity to its rim, and can include on the one hand known standard pneumatic tires, or on the other hand tires which differ therefrom in that they have radially and axially inwardly formed tire beads with radially outer bead seating surface to which are connected the side walls. In the event that the emergency operation comes into play for a pneumatic vehicle tire which has become under inflated or deflated, the central region of the inner surface of the carcass contacts the rim support surface, where it is supported. In order, in this emergency operation state, to assure that the vehicle can reliably be driven further at a lower, yet adequate, speed, a stabilization is provided of those surfaces of the rim and tire which rest against one another. In particular, the lateral movement between the tire and the rim support surface is to be prevented.

In order to provide a track or steering stability for the operation of the wheel and tire assembly, means are provided not only on the inner surface of the tire but also on the outer rim surface, for the rim support surface, which permit either a frictional or positive connection, and prevents the wheel and tire assembly from moving in an uncontrolled manner out of the prescribed direction of travel under the influence of the forces, especially component forces, which are brought about by the emergency operation.

For a vehicle wheel and pneumatic tire assembly of the aforementioned general type, an object of the present invention is to provide a structurally simple stabilizing means which can be integrated into the existing elements, which can be universally used for both types of tires and rims, which is rapidly and reliably effective, which causes no problems with regard to form, weight, imbalance, or space, and is relatively simple and economical to manufacture.

BRIEF DESCRIPTION OF THE DRAWING

This object, and other objects and advantages of the present invention, will appear more clearly from the following specification in conjunction with the accompanying schematic drawing, in which:

FIG. 1 is a partial cross-section of one inventive embodment showing a corrugation on the tire and on the emergency support member of the rim;

FIG. 2 is a partial cross-section of a modified form of the inventive corrugation;

FIG. 3 is a partial plan view of a plurality of grooves of the inventive corrugation, which is oriented in the circumferential direction of the tire;

FIG. 4 is a partial plan view of a corrugation which is oriented transverse to the circumferential direction of the tire;

FIG. 5 is a side view of the arrangement of FIG. 4;

FIG. 6 is a partial cross-section of a further inventive embodiment showing a corrugation on the rim support member and on the tire, which has inwardly disposed beads; and FIG. 7 is a partial plan view of an inventive corrugation in the form of knurling.

SUMMARY OF THE INVENTION

The vehicle wheel and tire assembly of the present invention is characterized primarily in that the stabilizing means is in the form of a corrugation provided not only on the surface of the support member of the rim, but also on the inner wall of the tire in the zenith region thereof. This corrugation can essentially comprise grooves which extend in the circumferential direction of the tire, and which have either a wavelike or toothed cross-section.

However, the corrugation can also comprise grooves which essentially extend transverse to the circumferential direction of the tire. It is furthermore also possible to form the corrugation as a type of knurling which is essentially a system of intersecting or diamond-shaped grooves.

If the corrugation comprises circumferential grooves, those surfaces of the rim and tire which contact one another are toothed in such a way that a lateral movement of the two is prevented, and that a ride of the tire as previously provided is assured in an unimpaired manner. The tire beads can either have a fixed bead seat, or, in the absence of a fixed bead seat, can move into the rim well. The tire beads can also be disposed in such a way that they are temporarily fixed, and later disengage and follow along. The corrugation provides a true positive connection in the transverse direction.

If the corrugation comprises transverse grooves or a knurling, those surfaces of the rim and tire which contact one another are toothed in such a way that a certain frictional and positive connection is produced in the direction of travel. In this connection, the tire beads disengage themselves relatively rapidly from the fixed bead seats, or the surfaces of the corrugation slide over one another for a short period of time and then firmly engage one another once again. The depth of the grooves of the corrugation are not very deep, and can be provided without difficulty. During an emergency operation, the corrugation serves to hold the wheel and tire assembly in such a way that it is provided with steering stability, so that no uncontrolled movements can result. Such movements would cause great danger, and must be avoided under all circumstances.

In the simpliest case, those elements which support the corrugation can be formed in portions of the rim support member or the inner surface of the tire.

However, those elements which support the corrugation can also be formed in separate elements, for example special layers of the inner surface of the tire, or a special layer of the rim support member; these separate elements or layers can then be disposed on the tire wall and on the rim support member.

With regard to the tire, the corrugated element can also be vulcanized therein. For example, the corrugation of the inner surface of the tire can be a groove system which can be formed in the vulcanizing press by the grooved venting system of a heat bellows. With regard to the rim, the corrugated element can be a plate of rubber, plastic, or a similar material, and can be positively or frictionally connected with the carrying member.

The groove surfaces can furthermore be provided with a lubricant, such as a gel of polyglycol and silicon dioxide containing very small roller bodies, such as small beads.

DESCRIPTION OF PREFERRED EMBODIMENTS

Referring now to the drawing in detail, FIG. 1 illustrates is a pneumatic vehicle tire 2, a rim 3, and an emergency operation support 4. These parts together form the vehicle wheel and tire assembly 1 of FIG. 1. The stabilizing means, for an emergency operation which provides track or steering stability, is in the form of a corrugation 5. This corrugation is formed either on the inner surface 8 of the tire 2 itself, or on a layer 6 provided on the surface 8. Furthermore, the corrugation 5 is formed either on the surface 7 of the emergency operation support member 4, or on a non-illustrated layer or part of the support member 4.

In FIG. 1, when viewed in cross section, the corrugation 5 is wavelike. The wave contour comprises valleys or troughs 9 and loops or peaks 10, which correspond with the troughs 9' and peaks 10' of the support contour when the inner surface of the tire and the emergency operation support surface rest against one another during an emergency operation, which is schematically illustrated in FIG. 1 by the dashed lines for the assembly 1'. The depth of the grooves is such that a reliable form-fitting connection is formed between the tire and the support member of the rim.

In the embodiment illustrated in FIG. 2, the cross-sectional shape of the corrugation is in the form of a toothed V belt. The depth of the troughs 9 are designated by the reference symbo $H_{ST}$ and the depth of the troughs 9' is designated by the reference symbol $H_M$. Both of these depths are essentially identical. The distance W is, for example, approximately four times the depth $H_M$. The corrugation 5 can be disposed in a special rubber layer 6 for that portion of the tire. The overall width $B_{ST}$ is approximately the same width as the tire tread, and is greater than the width $B_M$ of the corrugation on the emergency operation support member 4.

FIG. 3 shows three of the series of the corrugation grooves, which extend in the circumferential direction of the tire. One arrangement 14 is wide, one arrangement 13 is narrow, and the arrangement 15 is a combination of the two. The corrugations extend in the circumferential direction 11 of the tire.

FIG. 4 illustrates a corrugation 16 which extends transverse to the circumferential direction of the tire. FIG. 5 shows this corrugation in a side view, with the corrugation being formed not only on the inner surface 17 of the tire, but also on the surface 18 of the support member. This corrugation is in the form of a very fine tooth construction which allows the contact surfaces to rapidly mesh with one another, yet to also disengage and again mesh with one another when high tension forces are transmitted. The track or steering stability is achieved in the transverse direction by frictional contact.

FIG. 6 shows a vehicle wheel and tire assembly 20 which essentially comprises a tire 21 and a rim 22. In this arrangement, the tire beads 23 are disposed on the radially inner side of the rim, and the outer side 24 of the rim can be used during emergency operations as the emergency operation support surface. To provide stable running during an emergency operation, this arrangement is provided with the aforementioned corrugation, namely that illustrated in FIGS. 1 to 3.

FIG. 7 illustrates a knurling 25, which is provided not only on the outer part of the rim, but also on the inner surface of the tire. This knurling is constructed of slanted grooves which intersect one another or are diamond-shaped. This groove system is also a type of fine tooth construction.

It should furthermore be noted that with regard to the embodiments of FIGS. 1 to 3, the groove surfaces can be provided with a lubricant, for example a lubricant such as that disclosed in British Pat. No. 20 74 955. Such a lubricant is a gel of polyglycol and silicon dioxide, and contains very small roller bodies, such as small beads.

Steering stabilizing means of the type described assure during emergency operation that the tires do not shift laterally outwardly when driving in a curve, but rather are kept substantially stable with regard to the track or steering, so that the flat tire still rides on the tread and does not ride on the design of the shoulder or on the side wall. Furthermore, braking and driving forces can also be transmitted. The stabilizing means can be integrated into existing vehicle wheel and tire assemblies at a latter stage. In addition, a stabilizing means can be used with customary vehicle wheel and tire assemblies having a standard construction, i.e. with customary pneumatic tires and rims, or it can be used with rims which have no special support means.

The form of the stabilizing means, the rubber mixture in the event a special layer is used, or a special rim layer, are matched in conformity with the intended task of the vehicle wheel and tire assembly. This is true whether the assembly is driven or follows, and whether it is part of a front wheel drive or a rear wheel drive. The spacing of the grooves of the corrugation can be determined as a function of the width of the tire surface which is to be supported during emergency operation, and indirectly has a function of the inner width of the rim. The corrugation can, for example, be established during the finishing stage. On the other hand, the corrugation can be formed in the inner surface of the tire during the curing in the vulcanization press by the existing venting system which is on the outside of the heating bellows.

The inventive corrugation as the stabilizing means for the emergency operation is a simple and economical means which assures a relativel rapid and reliable positive connection between those parts, namely the inside surface of the tire and the rim support member surface, which rest against one another during an emergency operation.

The present invention is, of course, in no way restricted to the specific disclosure of the specification and drawing, but also encompasses any modifications within the scope of the appended claims.

What I claim is:

1. A vehicle wheel and tire assembly, which includes a pneumatic tire and a rim on which said tire is mounted; said rim being provided with an emergency support member having a support surface for supporting at least the zenith portion of the inner surface of said tire safely and securely rather than only incidently during an emergency operation; the improvement in combination therewith comprising:

stabilizing means, for steering stability during an emergency operation, provided both on said inner surface of said tire, and also on said support member of said rim;

said stabilizing means being effective irrespective of being subjected to straight ahead wheel movement as well as being subjected to uncontrolled transverse movements when tire air-pressure loss is encountered so that straight wheel movement no longer prevails;

said stabilizing means being in the form of a corrugation system including multiple projections and complemenetary grooves both on said support surface of said emergency support member on said rim, and on at least said zenith portion of said inner surface of said tire, said corrugation system respectively of said inner surface of said tire and of said support surface of said emergency support member at times actually establishing receiving engagement of said inner surface of said tire and said support surface of said emergency support member of said rim to permit frictional and positive connection produced therebetween in the direction of travel so that lateral movement between the tire inner surface and the rim support surface is prevented irrespective of straight ahead wheel movement as well as uncontrolled transverse movements, such positive connection precluding separation of the tire and the support member of the rim from each other so that the tire can roll along further affirmatively during such emergency operation when the there is under-inflated or deflated to assure that the vehicle can be reliably driven further at a lower, yet adequate, speed when stabilization is provided as said inner surface of said tire and said support surface of said emergency support member rest against one another for said positive connection via said corrugation system on each thereof respectively.

2. A vehicle wheel and tire assembly in combination according to claim 1, in which said corrugation sytem is oriented in the circumferential direction of said tire.

3. A vehicle wheel and tire assembly in combination according to claim 2, in which said corrugation system, when viewed in cross-section, is wavelike.

4. A vehicle wheel and tire assembly in combination according to claim 2, in which said corrugation system, when viewed in cross-section, has a toothed configuration.

5. A vehicle wheel and tire assembly in combination according to claim 2, in which said corrugation system, when viewed in cross-section, has a V belt configuration.

6. A vehicle wheel and tire assembly in combination according to claim 2, in which said corrugation system, when viewed in cross-section, has a toothed V belt configuration.

7. A vehicle wheel and tire assembly in combination according to claim 4, in which said corrugation system is a fine tooth construction.

8. A vehicle wheel and tire assembly in combination according to claim 1, in which said corrugation system comprises fine grooves which are oriented transverse to the circumferential direction of said tire.

9. A vehicle wheel and tire assembly in combination according to claim 1, in which said corrugation system is in the form of a knurling.

10. A vehicle wheel and tire assembly in combination according to claim 1, in which said corrugation system, on said inner surface of said tire, is a layer disposed thereon, and on said support member is a portion of the support surface of the latter.

11. A vehicle wheel and tire assembly in combination according to claim 1, in which said corrugation system of said inner surface of said tire is a groove system which is formed in a vulcanizing press by means of the grooved venting system of a heating bellows.

12. A vehicle wheel and tire assembly in combination according to claim 1, in which surfaces of said corrugation system facing one another are provided with a lubricant.

13. A vehicle wheel and tire assembly in combination according to claim 12, in which said lubricant is a gel of polyglycol and silicon dioxide, and contains very small roller bodies.